United States Patent [19]

Kawahara et al.

[11] 4,451,609

[45] May 29, 1984

[54] FLAME-RETARDED ACOUSTIC DIAPHRAGM

[75] Inventors: Fumio Kawahara; Masanori Takahashi; Katsuyoshi Kumagai, all of Yamagata, Japan

[73] Assignees: Pioneer Electronic Corporation, Tokyo; Mogami Denki Kabushiki Kaisha, Yamagata, both of Japan

[21] Appl. No.: 391,962

[22] Filed: Jun. 24, 1982

[30] Foreign Application Priority Data

Jun. 26, 1981 [JP] Japan .................................. 56-98417

[51] Int. Cl.³ ........................ G10K 13/00; H04R 7/00
[52] U.S. Cl. .................................. 524/708; 181/169; 428/530; 524/702; 524/733; 524/877
[58] Field of Search ....................... 181/169; 428/530; 524/702, 707, 708, 877, 733

[56] References Cited

U.S. PATENT DOCUMENTS

| 1,927,902 | 9/1933 | Rose | 181/169 |
| 2,376,200 | 5/1945 | Smidth | 524/877 |
| 3,865,783 | 2/1975 | Clutter | 524/708 |
| 3,907,063 | 9/1975 | Nakazawa et al. | 181/169 |

FOREIGN PATENT DOCUMENTS

| 52-29212 | 3/1977 | Japan | 181/169 |
| 52-29213 | 3/1977 | Japan | 181/169 |
| 53-15819 | 2/1978 | Japan | 181/169 |
| 53-15821 | 2/1978 | Japan | 181/169 |
| 53-56279 | 5/1978 | Japan | 428/530 |

*Primary Examiner*—Ronald W. Griffin

[57] ABSTRACT

A flame-retarded speaker diaphragm is prepared by making a cone from cellulose fibers, impregnating the cellulosic cone with a solution of a trimethylol melamine monomer, an organic phosphorus- and nitrogen-containing compound, and a trialkyl amine catalyst in an alcohol solvent, and heating the impregnated cone until the solvent is removed and the melamine resin is cured. Flame retardancy is imparted to the cellulose cone-shaped diaphragm without the sacrifice of its frequency response.

10 Claims, 1 Drawing Figure

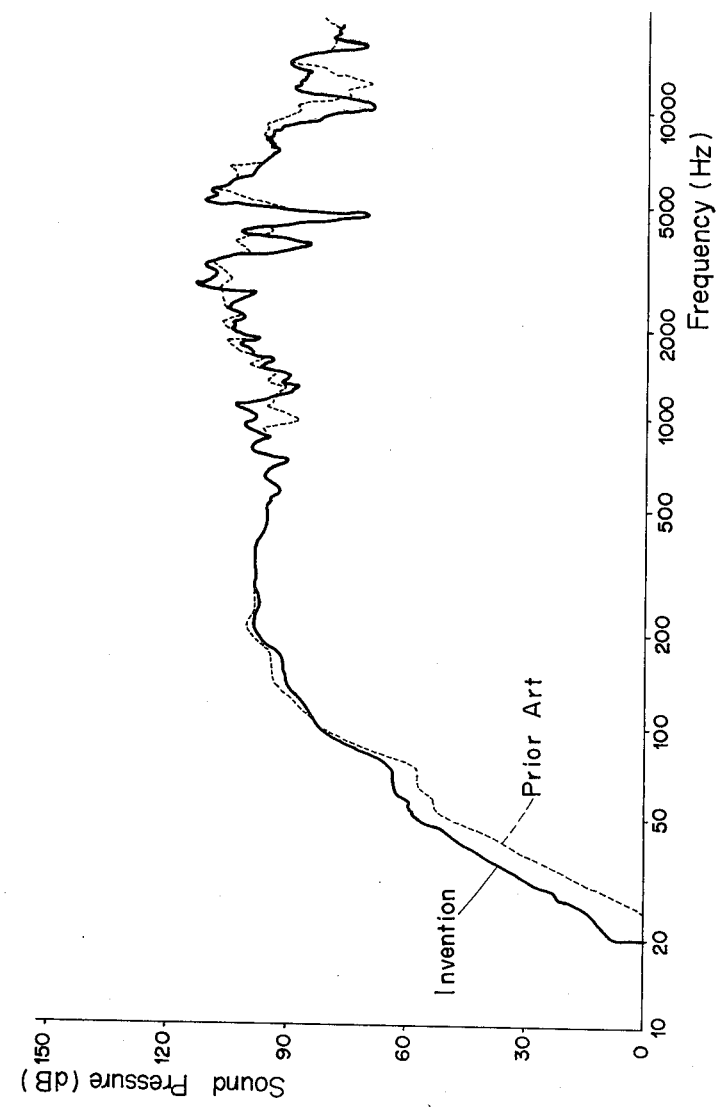

FLAME-RETARDED ACOUSTIC DIAPHRAGM

BACKGROUND OF THE INVENTION

This invention relates to flame-retarded acoustic diaphragms, and more particularly, to flame-retarded speaker diaphragms.

Acoustic diaphragms composed essentially of fibrous cellulose are well known in the art as having many advantages including a low mass, relatively high Young's modulus, optimum internal loss, and easiness of fabrication into a complicated configuration by paper making techniques. Such cellulosic diaphragms, however, are not flame resistant since the cellulose is a combustible substance.

such cellulosic diaphragms are unsuitable in applications where a voice coil sould be overheated or even fired due to overload input or a speaker is possibly subjected to elevated temperatures as in a television cabinet. There is a need for rendering the cellulosic diaphragms flame-retardant.

In this respect, inorganic asbestos has been widely employed as a flame-retardant. Because of the substantial mass of asbestos, speaker diaphragms made of cellulose in admixture with asbestos are unsatisfactory in sensitivity and sound quality.

Other examples of the flame-retardants for cellulose fibers are boric acid, boron, and chlorine-containing compounds. The use of boric acid or boron results in reduced speaker sensitivity because the resulting diaphragms exhibit increased hygroscopicity, considerably reduced strength, and increased mass. The use of chlorine-containing compounds has the shortcoming that harmful gases would evolve when the diaphragm is fired.

It is therefore, an object of the present invention to provide an improved flame-retarded acoustic diaphragm which is free of the above-mentioned shortcomings and capable of reproducing sound of quality.

SUMMARY OF THE INVENTION

According to a broad aspect of the present invention, there is provided a flame-retarded acoustic diaphragm comprising a cone composed of fibrous cellulose impregnated with an effective amount of an admixture of a low formaldehyde content melamine resin and an organic phosphorus- and nitrogen-containing compound. In a preferred embodiment of the present invention, a flame-retarded acoustic diaphragm is prepared by making a cone from cellulose fibers, impregnating the cellulose cone with an admixture of a low formaldehyde content malamine monomer and an organic phosphorus- and nitrogen-containing compound in an organic solvent, and heating the impregnated cone until it is free of the solvent.

BRIEF DESCRIPTION OF THE DRAWINGS

The single FIGURE is a diaphram showing the frequency response of the speaker diaphragm of the present invention

DESCRIPTION OF THE PREFERRED EMBODIMENTS

The starting fibrous cellulose may be any of commercially available cellulose materials used for the manufacture of acoustic diaphragms, including wood pulp and bast fibers. A typical example is a kraft paper cone which is commonly used in the art.

The first step of the process of the present invention is to make a cone from cellulose fibers by conventional paper making and forming techniques. The process starts from a cone rather than a sheet of fibrous cellulose for the following reason. Paper cones are formed by conventional paper making techniques and then dried by instantaneous heating as by pressing in a hot mold or placing in an oven for the purpose of increasing the specific modulus of elasticity $(E/\rho)$ and providing proper internal loss. Paper cone making followed by instantaneous heating results in a product which is hard at the surface and soft in the interior. On the other hand, paper sheets are slowly dried on rolls for a substantial period of time so that they have substantially uniform physical properties both at the surface and in the interior.

When paper cones are impregnated with a resin, the degree of impregnation or adherence largely differs between the surface and the interior. In the case of paper sheets, however, no substantial difference occurs in degree of impregnation or adherence. Although the degree of impregnation also depends on the concentration of an impregnating solution, the type of resin and curing agent, these factors may be neglected in this comparison.

In order to render such a paper cone flame-retardant by impregnating it with a flame retardant, coating only the cone surface with the flame retardant will suffice. It is not necessarily needed to cause the flame retardant to fully penetrate into the interior of the cone. Accordingly, the term "impregnation" used herein in the context of rendering a paper cone flame retardant by impregnating it with a flame retardant involves not only conventionally used impregnation, but also coating of the cone only at the surface with the flame retardant. The latter partial impregnation is rather advantageous because it is important to achieve the desired degree of flame retardancy with a minimal quantity of the flame retardant which is rather hygroscopic and hence, tends to reduce the Young's modulus of the flame-retarded diaphragm upon aging. It is also important in this respect to use the flame retardant in combination with a melamine resin for the purpose of rendering less hygroscopic, increasing Young's modulus and minimizing weight increase.

The organic phosphorus- and nitrogen-containing compounds used as a flame retardant in the present invention include derivatives of phosphonic acid which are soluble in alcohols such as ethanol and methanol and free of chlorine, bromine or other components capable of evolving harmful gases. The phosphonic acid derivatives are commercially available and may be used in the form of an alcoholic solution. A commercial example is FLAMEGARD 5527 (trademark, manufactured and sold by Dai-Nippon Ink K.K., Japan) which is an alcohol solution of a phosphonic acid derivative having the formula:

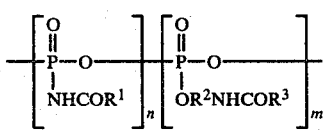

wherein $R^1$, $R^2$ and $R^3$ are alkyl and m and n are integers, and containing 17.1% by weight of phosphorus and 7.7% by weight of nitrogen. Another example of the flame retardant used herein is a combination of guanidine sulfamate and a condensed alkyl phosphate.

Although flame retarded diaphragms may be obtained by the treatment with the organic phosphorus- and nitrogen-containing compound, it is essential to firmly bind the flame retardant to the cone. In the present invention, the flame retardant or organic phosphorus- and nitrogen-containing compound is used in admixture with a low formaldehyde content melamine resin and optionally, an organic amine catalyst. The low formaldehyde content malamine resins herein include mono-, di- and tri-methylol melamines which are formed by reacting about 1-3 moles of formaldehyde, usually in the form of formaline with melamine. An alcohol, for example, methanol is added to the reaction solution to give a clear solution of methylated methylol melamine. The thus obtained methylol melamine monomer may be condensed or cured into a malamine polymer preferably in the presence of an organic amine catalyst only by heating. The organic amine may preferably be trialkyl amines, for example, triethyl amine and trimethyl amine. This heating is continued until the solvent is removed and the melamine resin is cured. The use of the melamine resin compensates for the hygroscopicity of the flame retardant to thereby render the treated diaphragm non-hygroscopic as well as improving heat resistance, compression strength and tensile strength. The use of the melamine resin has another advantage of aesthetic appearance.

A flame-retarded acoustic diaphragm may be prepared by the method of the present invention as follows. First of all, a fixed diaphragm in the form of a cone having an outer diameter of 16 cm, for example, is prepared from cellulose fibers by conventional paper making and forming techniques. The thus shaped cone is immersed in a solution of an organic phosphorus- and nitrogen-containing compound and a methylol melamine monomer in methanol or coated with the same solution in any suitable application manner as by spraying or brushing. The thus treated cone is then dried, for example, at 100° C. for 15 minutes, obtaining a flame-retarded diaphragm. The degree of flame retardance and hardness of the diaphragm may be controlled by changing the amount of the phosphorus- and nitrogen-containing compound adhered to the cone and the proportion of the phosphorus- and nitrogen-containing compound and the melamine resin. The preferred amount of the admixture of the phosphorus- and nitrogen-containing compound, the melamine resin, and optionally the amine adhered is 8-20% by weight based on the weight of the cellulosic cone. The organic phosphorus- and nitrogen-containing compound is admixed with the methylol melamine monomer and the organic amine into the form of a 5-20% alcohol solution such that the weight ratio of the organic phosphorus- and nitrogen-containing compound/melamine resin/organic amine is in the range of 5-20: 0.1-5: 0.1-3. It is also important in the present invention to use an alcohol such as methanol as the solvent for the impregnating or coating solution because the alcohol solvent permits the cone of cellulose fibers, which are likely to swell in the presence of water, to be promptly treated without deforming its shape.

The present invention will be more fully understood from the following examples. All percents are by weight.

EXAMPLE 1

A fixed diaphragm in the form of a cone having an outer diameter of 20 cm was prepared from cellulose fibers by contentional paper making and forming techniques. The thus formed cone was impregnated in an alcohol solution containing 5% of FLAMEGARD 5527 (organic phosphorus- and nitrogen-containing compound, manufactured and sold by Dai-Nippon Ink K.K.), 5% of BECAMINE PM-N (methylol melamine monomer, manufactured and sold by Dai-Nippon Ink K.K.) and 1% of triethyl amine. The total amount of these three agents adhered to the cone was 13.9%. The impregnated cone was heated at 100° C. for 15 minutes until the solvent was removed and the melamine resin was cured. A combustion test was carried out on the resulting cone. No ignition was observed immediately after the cone was moved away from flame. It is evident that the cone has an improved degree of flame retardancy meeting the requirement of UL 94-V-O.

The various physical properties of the flame-retarded diaphragm of the present invention are shown in Table 1 together with those of a similar diaphragm (prior art) which is not flame retarded.

TABLE 1

| | Prior Art | Invention |
|---|---|---|
| Paper thickness (mm) | 0.202 | 0.225 |
| Weight per unit area (g/m$^2$) | 116.6 | 128.5 |
| Density, $\rho$(g/cm$^3$) | 0.577 | 0.571 |
| Young's modulus, E(dyne/cm$^2 \times 10^{10}$) | 3.97 | 3.77 |
| Internal loss, tan$\delta$ | 0.0416 | 0.0538 |
| Rate of propagation, $\sqrt{E/\rho}$ (cm/sec $\times 10^5$) | 2.61 | 2.56 |
| Elasticity loss, $\Delta E$(dyne/cm$^2 \times 10^8$) | 15.8 | 20.1 |

As seen from the data of Table 1, the flame retarding treatment of the present invention allows the internal loss of a cellulose cone to be improved without a substantial loss of Young's modulus.

EXAMPLE 2

A fixed diaphragm in the form of a cone having an outer diameter of 16 cm was prepared from cellulose fibers by conventional paper making and forming techniques. The cone was immersed in an alcohol solution containing 20% of FLAMEGARD 5527, 1% of BECAMINE RM-N, and 0.5% of triethyl amine, and then heated at 100° C. for 15 minutes. A combustion test was carried out on the resulting diaphragm, which was found to have an improved degree of flame retardancy meeting the requirement of UL 94-V-O.

The frequency response of the above flame-retarded diaphragm of the present invention is shown in the accompanying FIGURE together with that of a prior art or similar diaphragm which is not flame retarted. The response of the flame-retarded diaphragm is shown in solid line and that of the prior art diaphragm is shown in broken line. As seen from the FIGURE, the flame-retarded diaphragm of the present invention is comparable to the conventional one in frequency response over the entire frequency range. In addition, the flame-regarded diaphragm of the present invention has improved moisture resistance and mechanical strength so that it is stable for a prolonged period of time without the possibility of moisture absorption or deformation.

As apparent from the foregoing, the present invention provides speaker diaphragms which are characterized by flame retardancy and improved sound quality.

What is claimed is:

1. A flame-retarded acoustic diaphragm comprising a cone composed of fibrous cellulose, impregnated with an admixture of a low formaldehyde content melamine resin as a binder and an organic phosphorus- and nitrogen-containing compound, as a flame retardent impregnated therein, said organic phosphorus- and nitrogen-containing compound being selected from derivatives of phosphonic acid having the formula as follows:

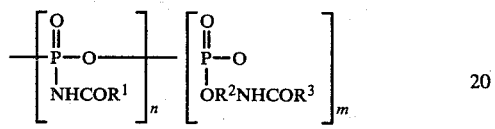

wherein $R^1$, $R^2$ and $R^3$ are alkyl and m and n are integers, said flame retardent being present in an amount sufficient to retard flames on over heating of said diaphragm and said melamine resin being present in an amount sufficient to firmly bind said flame retardent to said diaphragm.

2. A flame-retarded acoustic diaphragm according to claim 1 wherein said admixture further contains an organic amine.

3. A flame-retarded acoustic diaphragm according to claim 1 or 2 wherein the amount of said admixture is in the range of 8–20 % based on the weight of the cellulosic cone.

4. A flame-retarded acoustic diaphragm according to claim 2 wherein the weight ratio of the phosphorus- and nitrogen-containing compound to the melamine resin to the amine is in the range of 5–20: 0.1–5: 0.1–3.

5. A flame-regarded acoustic diaphragm according to claim 1 wherein said low formaldehyde content melamine resin is a trimethylol melamine polymer.

6. A flame-retarded acoustic diaphragm according to claim 2 wherein said organic amine is selected from the group consisting of triethyl amine and trimethyl amine.

7. A flame-retarded acoustic diaphragm prepared by a method comprising the steps of
   making a cone from cellulose fibers,
   impregnating the cellulosic cone with an admixture of a low formaldehyde content melamine monomer and an organic phosphorus- and nitrogen-containing compound in an organic solvent, and
   heating the impregnated cone until the solvent is removed and the melamine resin is cured, said organic phosphorus- and nitrogen-containing compound being selected from derivatives of phosphonic acid having the formula as follows:

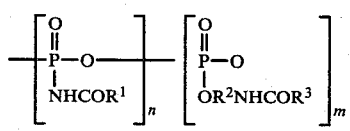

wherein $R^1$, $R^2$ and $R^3$ are alkyl and m and n are integers.

8. A flame-retarded acoustic diaphragm according to claim 7 wherein said low-formaldehyde content melamine monomer is triemethylol melamine monomer and said organic solvent is an alcohol.

9. A flame-retarded acoustic diaphragm according to claims 7 or 8 wherein said admixture further contains an organic amine.

10. A flame-retarded acoustic diaphragm according to claim 9 wherein said organic amine is selected from the group consisting of triethyl amine and trimethyl amine.

* * * * *